March 24, 1970  C. M. ASHLEY  3,501,924
WATER WASH OF ICE FORMED IN VACUUM FREEZING
Filed June 28, 1955  3 Sheets-Sheet 1

FIG. I

INVENTOR.
Carlyle M. Ashley
BY Herman Said
atty.

March 24, 1970  C. M. ASHLEY  3,501,924
WATER WASH OF ICE FORMED IN VACUUM FREEZING
Filed June 28, 1955  3 Sheets-Sheet 3

INVENTOR.
Carlyle M. Ashley
BY Herman Said
atty.

United States Patent Office 3,501,924
Patented Mar. 24, 1970

3,501,924
WATER WASH OF ICE FORMED IN VACUUM FREEZING
Carlyle M. Ashley, Fayetteville, N.Y., assignor to Carrier Corporation, Syracuse, N.Y., a corporation of Delaware
Filed June 28, 1955, Ser. No. 518,431
Int. Cl. B01d 9/04; C02b 1/12
U.S. Cl. 62—123                   3 Claims

ABSTRACT OF THE DISCLOSURE

A brine solution is vaporized to form an ice slurry. A separator receiving the ice slurry includes a vertically extending vessel having an open end. Means substantially surrounding the open end of the vessel receives separated ice. Wash liquid is discharged directly on the separated ice in the vessel. Means are placed adjacent the open end of the vessel for transferring the washed ice to the receiving means.

---

This invention relates to a method and apparatus for rendering saline water potable and, more particularly, to a method and apparatus for converting sea water to potable water.

It is known that sea water may be purified by freezing. No commercially satisfactory system has heretofore been devised. Those systems which have been advanced either demand extravagant amounts of energy or else purify water inadequately. For example, prior centrifugal separation systems had failed for even the great centrifugal forces used were insufficient to overcome the tenacity with which the brine clings to the finely divided ice. Washing systems were unsuccessful because of the tremendous amount of fresh water which they required. These difficulties are more readily understandable when it is understood that the brine not only clings to the surface of the ice but also remains in the interstices between the ice crystals. This difficult situation is further aggravated by the need to reduce the impurity content of the water to less than 800 parts per million in order to render it potable.

The chief object of the present invention is to provide a method and apparatus for rendering saline water potable utilizing a freezing operation which obviates the disadvantages present in systems heretofore known.

An object of the present invention is to provide apparatus for converting a brine solution such as sea water to potable water which is highly efficient and effective in operation and which utilizes a freezing operation to concentrate or remove potable water from the solution.

A further object is to provide apparatus for forming and separating potable water from a brine solution such as sea water in which freezing means are employed to form ice from the brine solution, the ice being removed from the solution, further cleaned to remove brine and melted to provide potable water.

A still further object is to provide a method of forming potable water from a saline solution such as sea water. Other objects of the invention will be readily perceived from the following description.

This invention relates to a method of rendering saline water potable in which the steps consist in forming ice from a saline solution such as sea water thus creating a mixture of ice and sea water, separating the ice from the mixture, and removing brine from the surface and interstices. The word "brine" is employed herein to denote salt in solution and in a crystalline form.

This invention further relates to a system for rendering saline water potable which comprises means for forming ice from a saline solution, means for separating the ice and the brine, and means for removing the brine from the surface and interstices of the formed ice. The brine may be removed from the formed ice by washing the ice with water recycled in the system if desired; such water may be employed in a quantity between 5% to 15% of the weight of the ice to be washed.

The ice may be formed in various ways such as by vacuum freezing, in which case, the wash water may be directly obtained from the water vapor drawn off in the vacuum freezing process, or by forming the ice on a refrigerated surface and removing the ice by mechanical means. Preferably, the separating means utilize the different densities of brine and ice for separation.

The attached drawings illustrate a preferred embodiment of the invention, in which FIGURE 1 is a diagrammatic view of a preferred embodiment of the invention employing a gravity column type separator and utilizing an absorption refrigeration system for primary freezing;

Figure 1:
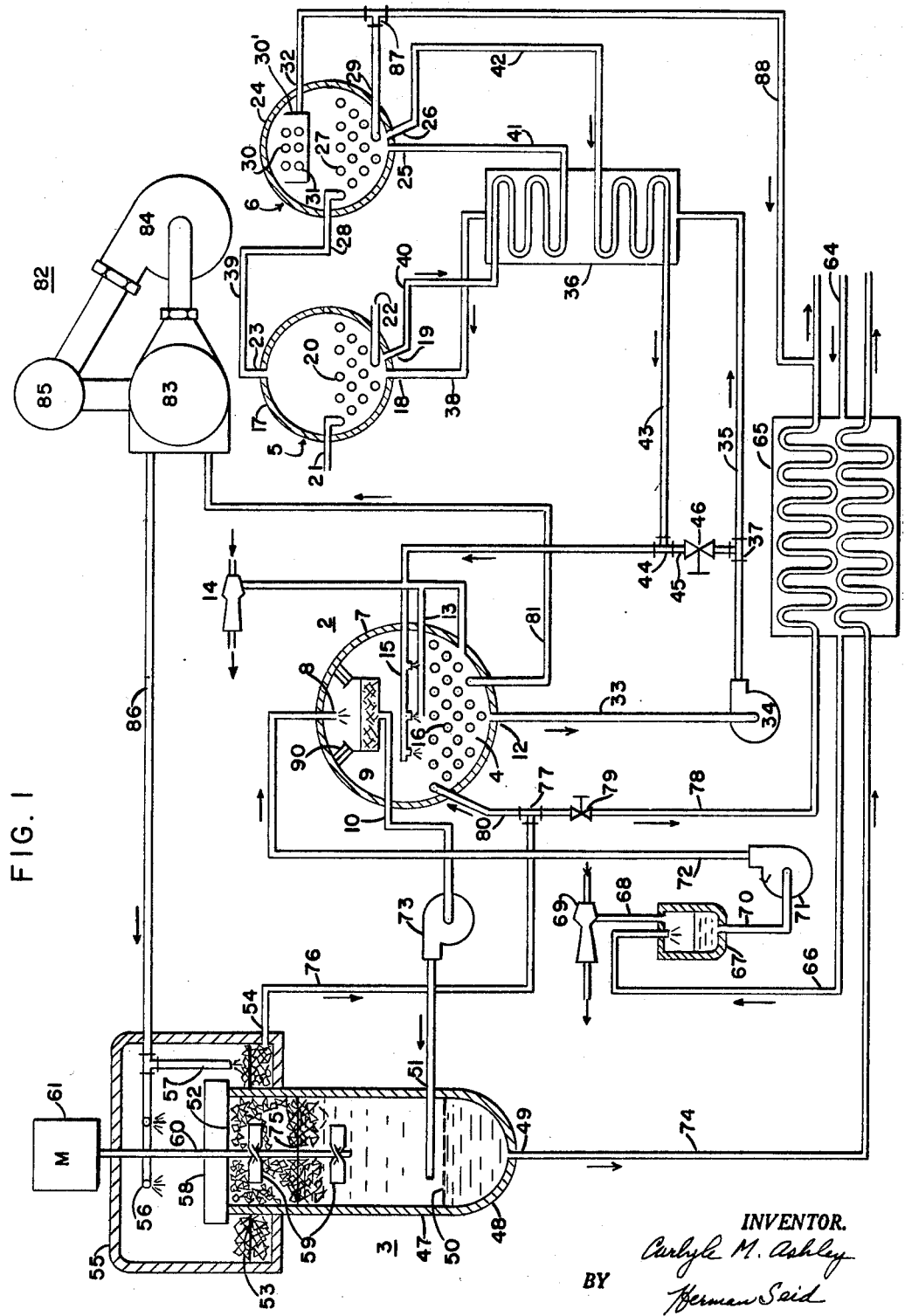

Referring to the drawings, there is shown in FIGURE 1 a system for rendering saline water potable which utilizes an absorption refrigeration system 2 for vacuum freezing water in the brine solution and a combined separating and washing system 3.

The absorption refrigeration system comprises a horizontally extending shell 7 containing an evaporator 9 and absorber 4, a first generator 5 and a second generator 6.

Located in the upper portion of shell 7 are nozzles 8 which introduce sea water into the evaporator 9 which may comprise a longitudinally extending trough located in the upper portion of shell 7. The trough cooperates with the shell 7 to form the evaporator 9. A discharge line 10 serves to remove liquid from the trough. Eliminators 90 are provided adjacent the evaporator 9 to remove any drops of liquid present in the flashed vapor flowing to absorber 4.

The absorber 4 is placed in the lower portion of shell 7. Located at the lower portion of the shell is a weak absorbent discharge line 12. Located above the discharge line 12 are purge lines 13 through which noncondensible gases are withdrawn from the shell by a suitable purge 14. Absorber spray nozzles 15 are located above the purge lines. Below these spray nozzles is an absorber coil 16 through which a cooling medium is passed. Coil 16 cooperates with the shell 7 to form the absorber 4.

In normal operation, strong absorbent is distributed over coil 16. This absorbent acts to absorb the water vapor and thus reduce the vapor pressure which causes flash evaporation to take place as sea water is introduced through the nozzles 8. The water vapor so formed is absorbed in the absorbent accompanied by a freezing effect in the evaporator.

In order to maintain a continuous process, it is necessary to reconstitute the absorbent solution. This is accomplished by passing weak absorbent into two generator stages wherein the absorbent is reconstituted.

These two generator stages are carried out in a first generator 5 and a second generator 6. The first generator 5 comprises a horizontal cylindrical shell containing a steam coil 20. Steam inlet 21 provides steam to coil 20, outlet 22 permitting condensate to drain therefrom. An inlet 18 is provided in the shell for weak absorbent. An outlet 19 is provided to carry away partially reconstituted absorbent. Connected to the upper portion of the shell is a vapor outlet 23. As steam is introduced into the first generator, part of the water in the absorbent is boiled off, the vapor so formed passing through outlet 23 and line 39 to the second generator 6. The intermediate strength absorbent liquid is forwarded to the second generator through the outlet 19.

The second generator 6 comprises a horizontal cylindrical shell 24 containing a coil 27 which cooperates with the shell to form the generator. An absorbent inlet 25 is provided in shell 24. Coil 27 receives water vapor from the first generator through outlet 23, line 39 and inlet 28. As the absorbent enters the second generator, it is placed in heat exchange relation with vapor inside coil 27 to boil off additional water vapor from the absorbent. A condenser 30 is located, preferably, in the upper portion of the cylindrical shell 24, and may comprise a trough 30' and a coil 31 through which a suitable cooling medium is passed in heat exchange relation with vapor passing to the condenser from generator 6. The trough and coil cooperate with the shell 6 to form condenser 30. The trough 30' has an outlet 32 through which the condensate may be discharged.

The operation of the absorption refrigeration system is as follows:

Sea water is introduced into evaporator 9 through the nozzles 8. Since shell 4 is maintained under a high vacuum, plus the presence of an absorbent in the shell, flash evaporation occurs, the flashed vapor passing downward to the absorber and being absorbed by the absorbent. The flashed vapor carries off latent heat of the sea water thereby cooling the remaining sea water to a degree that ice formation occurs, forming a mixture of ice and brine.

In order to introduce strong absorbent solution and to increase the efficiency of the absorber, spray nozzles 15 are located above the absorbent pool so that strong absorbent solution returning from the generator may more readily assimilate the water vapor. To further improve the efficiency of the absorbent, the cooling coil 16 removes heat from the refrigeration cycle. Any non-condensible gases collected in the absorber are purged through the purge lines 13 by purge 14.

The weak absorbent is withdrawn from the absorber through outlet 12 and line 33 by pump 34 which passes the weak absorbent through line 35 to a heat exchanger 36. Located in the line 35, is a T-junction 37, the purpose of which will be explained hereafter. Heat exchanger 36 places the hot absorbent from the generator in heat exchange relation with cool absorbent from the absorber to permit the absorption refrigeration system to operate more efficiently. The weak absorbent solution emerges from the heat exchanger at a higher temperature and passes through line 38 to the inlet 18 of generator 5. Weak absorbent is boiled off in generator 5, the water vapor passing through the water vapor outlet 23 and line 39 to the coil 27 of the second generator 6. The absorbent then at an intermediate strength is forwarded from generator 5 through outlet 19 and line 40 to the heat exchanger 36 where it is placed in heat exchange relation with weak absorbent thus cooling the absorbent of intermediate strength.

The absorbent of intermediate strength is then passed into the second generator through line 41 and inlet 25 where the absorbent is placed in heat exchange relation with vapor in coil 27 to boil off vapor from the absorbent. This water vapor passes upwardly into the condenser 30 and is condensed by the cooling medium passing through coil 31. The condensate so formed is pure water and is discharged from the condenser 30 through line 32. Simultaneously with the evaporation of the water in the absorbent in generator 6, the water vapor or low pressure steam from the first generator is condensed in the coil 27, the condensate being forwarded through line 29 to T 87 joining line 32 and line 88 where it joins the condensate stream from condenser 30, and is discharged from the system. This fluid constitutes pure water.

Referring to the second generator 6, the intermediate strength absorbent introduced at inlet 25 passes through the second generator and is discharged as strong solution at the outlet 26, being forwarded through line 42 to the heat exchanger 36 where the strong absorbent is again cooled. The strong solution passes through the heat exchanger 36 and line 43 to the absorber. Located in the line 43 is a T 44. Connecting the T 44 and the T 37 is a line 45 having a control valve 46. This arrangement permits recirculation of absorbent liquid if desired. The absorbent in line 43 passes to the nozzles 15; it is obvious that as weak solution is passed from the absorber, strong solution is continuously reintroduced.

The operation of a suitable absorption refrigeration system has been generally described. Reference is made to the co-pending application of Louis H. Leonard, Jr., Ser. No. 240,645, filed Aug. 7, 1951, now U.S. Pat. No. 2,722,805, granted Nov. 8, 1955, for a more complete description of a suitable absorption refrigeration system which may be embodied in the present invention.

The combination separating and washing arrangement 3 comprises a vertical cylindrical shell 47 having a dished bottom 48. Located in the bottom of this dish is a brine discharge outlet 49. A screen 50 may be placed immediately above the dished bottom; above the screen is located an ice and brine inlet 51 which comprises a pipe section extending into the shell and adapted to distribute the ice and brine solution as it enters the shell. As the mixture of ice and brine are introduced into the shell the brine, because of gravity and its greater density, will tend to pass through the screen 50 and be discharged through outlet 49. The screen 50 is an optional construction which tends to keep the ice that is introduced in the upper portion of the shell where it will normally rise. The upper portion of the shell has an open end 52. Located about this open end is a trough 53 which, as shown in the present embodiment, appears as a circular trough running concentrically around the open end of the shell. The purpose of this trough is to collect and melt washed ice. Located in the trough is an outlet 54 through which pure water may be discharged. The outer wall of the trough may be extended upwardly to form a hood 55 over the trough and the open end of the shell. Located in this hood are the washing nozzles 5 which are placed above the open end of the shell. Nozzles 57 may be placed above the trough to discharge water over ice in the trough to melt the ice.

Above the open end of the shell is a slinger 58. This slinger comprises a series of blades adapted to push ice outwardly as it emerges from the shell. Agitator blades 59 may be placed in the shell if desired. The slinger 58 and the agitator blades 59 are attached to a drive shaft 60 which is driven by a motor 61 mounted outside the hood 55.

In the operation of the system, sea water is introduced through line 64 into the heat exchanger 65. The temperature of the water is brought down near its freezing point by its passage in heat exchange relation with pure water being discharged from the system and with the concentrated brine removed from separator 3. The water is passed from the heat exchanger through line 66 to a deaerator 67. In the deaerator, non-condensible gases are withdrawn through the line 68 by a suitable purge 69. The sea water is withdrawn from the deaerator 67 through line 70 by a pump 71 which forwards the sea water through line 72 to the nozzles 8 of evaporator 9 of the absorption refrigeration system. Nozzles 8 spray the sea water in the evaporator. Since the shell 7 is under a high vacuum, flash evaporation occurs, a portion of the sea water flashing into water vapor which, as previously described, passes to the absorber and is absorbed by the absorbent. The freezing process which accompanies the flash evaporation forms an ice and brine solution which falls into the trough of the evaporator 9. The mixture of ice and brine solution so collected in the trough is discharged from the absorption system through the line 10.

The mixture of ice and brine solution is withdrawn from the evaporator 9 by the pump 73 which forwards the mixture to the separating and washing arrangement 3. The mixture of ice and brine solution enters the shell 47 through inlet 51. Due to the different densities of the ice and brine solution, a natural separation process takes place with the brine passing downwardly through the screen 50 being withdrawn from shell 47 through outlet 49 and forwarded through line 74 to the heat exchanger 65. In the heat exchanger 65, this low temperature brine solution aids in absorbing the heat from the sea water being supplied to the system.

The ice which enters shell 47 through inlet 51 with the brine solution tends to rise because of its lighter density. To ensure that ice is not removed with the brine solution through outlet 49, the screen 50 maintains solid ice particles in the upper portion of the vertical shell. The level of the ice and brine mixture may be maintained at the level indicated by the numeral 75. This level may be maintained by any suitable control arrangement (not shown), for example, a float type control mechanism operatively connected to the pump 73.

As the ice enters the upper portion of the vertical shell 47 it begins to pack slightly; to avoid this undesirable situation, agitator blades 59 may be provided to avoid formation of ice masses.

Due to the difference in density between the ice and the brine solution, the ice is urged by buoyancy forces above the liquid level 75, permitting free liquid to drain from the ice. Fresh water is sprayed through the nozzles 56 over the ice to wash and remove minute quantities of brine clinging to the surface and in the interstices of the ice. Such minute quantities of brine may cause any water formed from the ice at this stage to be sufficiently impure as to render it unpotable.

The fresh water which passes through the column of ice above the liquid level 75 reaches the liquid level with a comparatively small concentration of brine. Since this liquid is less dense than the brine solution, it tends to remain on the top of the liquid and ice column and as more water is introduced to the ice it will slowly pass downward through the column of liquid and ice in a counter-flow relation to the ice which flows upwardly through the liquid column. As the water flows downward the concentrated brine adhering to the surface and trapped in the interstices of the slush ice will be leached out. As the ice flows upwardly it will be surrounded by a liquid of gradually decreasing brine concentration. Thus, the fresh water will pick up more and more brine as it moves downward through the column and will thus provide a continuous washing operation which is equivalent to a substantial number of stages of washing. As this downwardly moving brine solution reaches the level of inlet 51, it will be only slightly less concentrated than the brine introduced into the separator shell and will serve to dilute the concentrated brine only slightly. By this process the fresh water used in washing continually increases its brine concentration as it passes downwardly so that only a small quantity of fresh water is necessary to carry out a complete washing action.

As the ice mass which has emerged from the brine solution continues to rise it comes into contact with the revolving slinger 58 which is driven by the motor 60. As the ice comes into contact with the slinger blades it is cast outwardly into the trough 53. Fresh water is introduced continually into the trough through melting nozzles 57 which causes the ice to melt and to pass from the trough section through the line 76 and out of the combination separating and washing section.

It will be understood that water being discharged from the trough 53 through outlet 54 and line 76 is very close to its freezing point. Upon reaching the T 77 a portion of the potable water passes though line 78 to the heat exchanger 65 where its cooling qualities are taken advantage of to cool incoming sea water. Located in the line 78 is the valve 79 which regulates the amount of water passing through line 78.

Part of the potable water formed as described previously passes from T 77 through line 80 to the coil 16 of the absorber. This water serves as a cooling medium for the absorbent in the absorption machine, thereby increasing the efficiency of the machine. The water passes from the coil 16 through line 81 to a secondary refrigeration system designated generally at 82. In the present embodiment, this system is of a mechanical type which comprises a cooler 83, a centrifugal compressor 84 and a condenser 85. Water from the coil 16 is passed through the cooler 83, and line 86 to the nozzles 57 and 56 of the separating and washing arrangement and is sprayed to wash and melt the ice.

In the embodiment of my invention as shown in FIGURE 1, a water purification system is provided in which sea water is frozen, utilizing an absorption refrigeration machine capable of handling large quantities of water vapor which is subsequently condensed and used to wash and melt the ice. In the absorption refrigeration machine utilized in the system, two generators are employed although it will be understood only one generator is necessary. Use of the second generator improves the efficiency of the machine. A heat exchanger is provided to further increase the efficiency of the machine so that the low temperatures of both the potable water produced and the discharged brine solution are utilized to cool incoming sea water.

Figure 2:
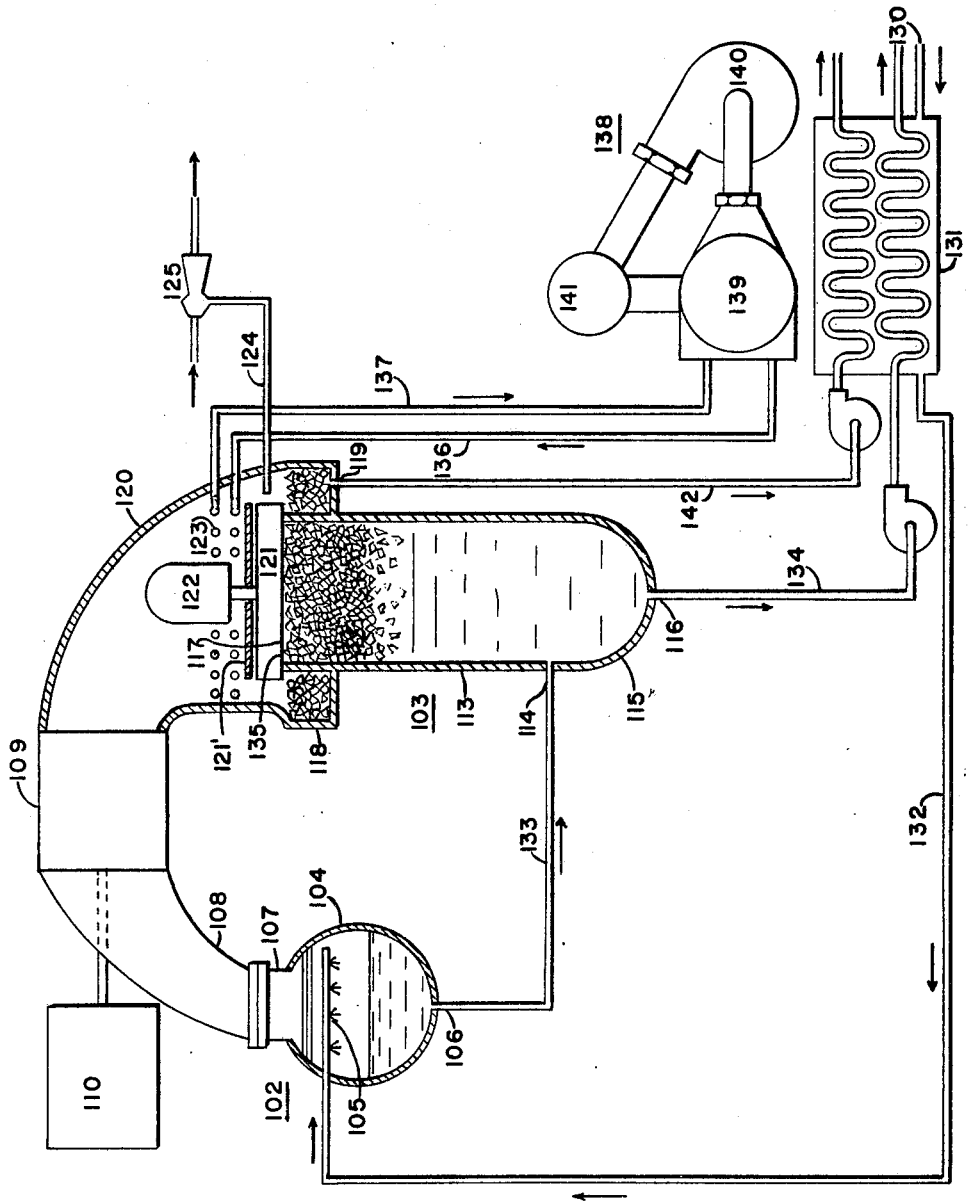
FIGURE 2 is a diagrammatic view of a modified form of the invention employing a gravity column separator and utilizing a compressor for primary freezing.

Referring to FIGURE 2, there is shown a modified form of the invention employing a vacuum freezing system 102 and a combination separating and washing unit 103.

The vacuum freezing system comprises essentially a horizontal cylindrical shell 104. Spray nozzles 105 are provided to introduce sea water into the shell 104. Shell 104 is maintained under a desired vacuum by means of axial compressor 109 so that sea water discharged by nozzles 105 into shell 104 flashes, the flashed vapor carrying off latent heat in such quantity that a mixture of ice and brine solution is formed. The flashed vapor is withdrawn from shell 104 through outlet 107 and line 108 by the axial compressor 109. The ice and brine solution falls to the lower section of the shell 104 and may be withdrawn through outlet 106.

Axial compressor 109 is driven by motor 110. It is appreciated that any suitable prime mover may be substituted for motor 110. The flash evaporation or vacuum freezing procedure in this embodiment is similar to that described in the embodiment shown in FIGURE 1. However, in this modification an axial compressor rather than an absorption refrigeration system is utilized to create the desired vacuum in shell 104.

Any system utilizing flash evaporation is within the scope of the term "vacuum freezing" as employed herein. Flash evaporation is caused by the difference in vapor pressure of the incoming sea water and pressure maintained in the evaporating chamber so that part of the sprayed sea water flashes, carrying off latent heat and reducing the temperature of the remaining part to a point at which a mixture of ice and brine solution is formed.

The combination separating and washing unit 103 includes a vertical cylindrical shell 113. Intermediate the ends of this shell is located an ice and brine inlet 114 connected to the outet 106 of shell 104 by line 133. Shell 113 has a bottom 115 containing a brine solution discharge outlet 116. The upper end of the shell is open as indicated at 117. Extending about this open end is a trough 118 containing a discharge outlet 119. The operation of the structure just described is essentially similar to the operation of the embodiment of the invention shown in FIGURE 1. That is, as the mixture of ice and brine solution is introduced through the inlet 114, the brine solution, because of its greater density, will sink to the bottom 115 of shell 113 and be discharged through outlet 116.

The sides of the trough 118, preferably, are extended upwardly to form a hood 120 over the trough and the open end of the shell which is connected with the discharge of the compressor 109.

A slinger 121 similar to the one indicated in my preferred embodiment is placed flush with the open end of the vessel, and may be driven by motor 122 or any suitable prime mover.

A condensing coil 123 is placed in hood 120 for a purpose hereinafter explained. A purge line 124 extends in hood 120 and is connected to a suitable purge 125 to remove all non-condensible gases collected in the hood.

In operation, sea water is introduced through the line 130 to the heat exchanger 131 where it is placed in heat exchange relation with cold brine solution being discharged from the system and with the cold potable water passing to the place of use. The temperature of the sea water is decreased to approximately a few degrees above the freezing point of water in the heat exchanger. The cooled sea water is forwarded from the heat exchanger 131 through line 132 to the vacuum freezing unit 102, being sprayed therein by nozzles 105. As previously described, because of the high vacuum maintained in the shell 104, flash evaporation occurs forming a mixture of ice and brine solution. Water vapor so formed is withdrawn through outlet 107 and line 108 by the axial compressor 109. The compressed water vapor is then forwarded to hood 120.

Simultaneously, the mixture of ice and brine solution formed during vacuum freezing in shell 104 is withdrawn through outlet 106 and line 133 and is forwarded to shell 113, being discharged in shell 113 through inlet 114. The heavier brine solution tends to fall to the dished bottom 115 of the shell and is subsequently withdrawn through outlet 116, and forwarded through line 134 to the heat exchanger 131. After passage through heat exchanger 131, the brine solution is discharged from the system.

As the brine solution settles in shell 113, there is simultaneously a rising of the ice and, because of its lighter density, a natural separation tends to take place between the ice and the brine solution. In this embodiment, the ice and brine solution is shown maintained throughout the height of the shell, the brine solution level 135 being substantially coincident with the open end 117 of the vessel.

As previously mentioned, there is placed in the hood 120 a cooling coil 123 through which a cooling medium is passed in heat exchange relation with vapor passing over the exterior surfaces of the coil. In the present embodiment, the cooling medium may be provided by a secondary refrigeration system indicated generally at 138 which comprises a cooler 139, a compressor 140 and a condenser 131. The cooling medium, which is passed through the coil 123, is withdrawn through the line 137, chilled in the cooler and then supplied to the coil 123 through line 136. Flashed vapor from the vacuum freezing chamber is compressed by the axial compressor 109 and discharged into the hood 120. Water vapor coming into the hood is placed in heat exchange relation with cooling medium passing through the cooling coil 123 thereby reducing the amount of superheat in the vapor and forming some condensate.

The compressed vapor in hood 120 is permitted to come directly in contact with the ice and brine level at the top of column 113. A portion of the vapor is condensed on the ice, thereby supplying the water required for the washing action. A baffle 121' may be provided above slinger 121 to restrict entrance of vapor to the ice at the top of the column, thereby regulating the amount of liquid condensed on the ice. It is appreciated since the liquid level is maintained at the top of the column, any excess water condensed from the vapor at the top of the column will overflow into the annular space 118. In this case, the amount of water flowing down from the top of the column can be regulated by suitable throttling of the brine flow in line 133, by means of a suitable density or salinity control means not shown. As the ice in the brine solution rises upwardly in the vertical shell 113 there is formed a porous mass of ice near the liquid level 135. Condensate from the coil 123 is supplied to the surface 135 and a counterflow relationship between the ice as it is being buoyed upwardly and the potable water which is being supplied takes place. As this potable water passes downwardly it washes the brine from the surface and interstices of the ice. As the counterflow process takes place ice is continually emerging from the brine level 135 whereupon the slinger 121 creates an ice particle spray which condenses the vapor and is deposited in the trough 118 where the water and remaining ice is collected and the ice subsequently melted by condensed vapor. This melted ice constitutes fresh water and is withdrawn from the trough 118 through outlet 119, being forwarded through line 142, to heat exchanger 131 where the water is utilized to chill incoming sea water.

This modification of my invention embodies the basic method of recovery as described previously; however, vacuum freezing is accomplished utilizing an axial compressor, and vapor is utilized to wash the ice while in the brine solution and also to melt the ice utilizing the compressed vapor.

Figure 3:
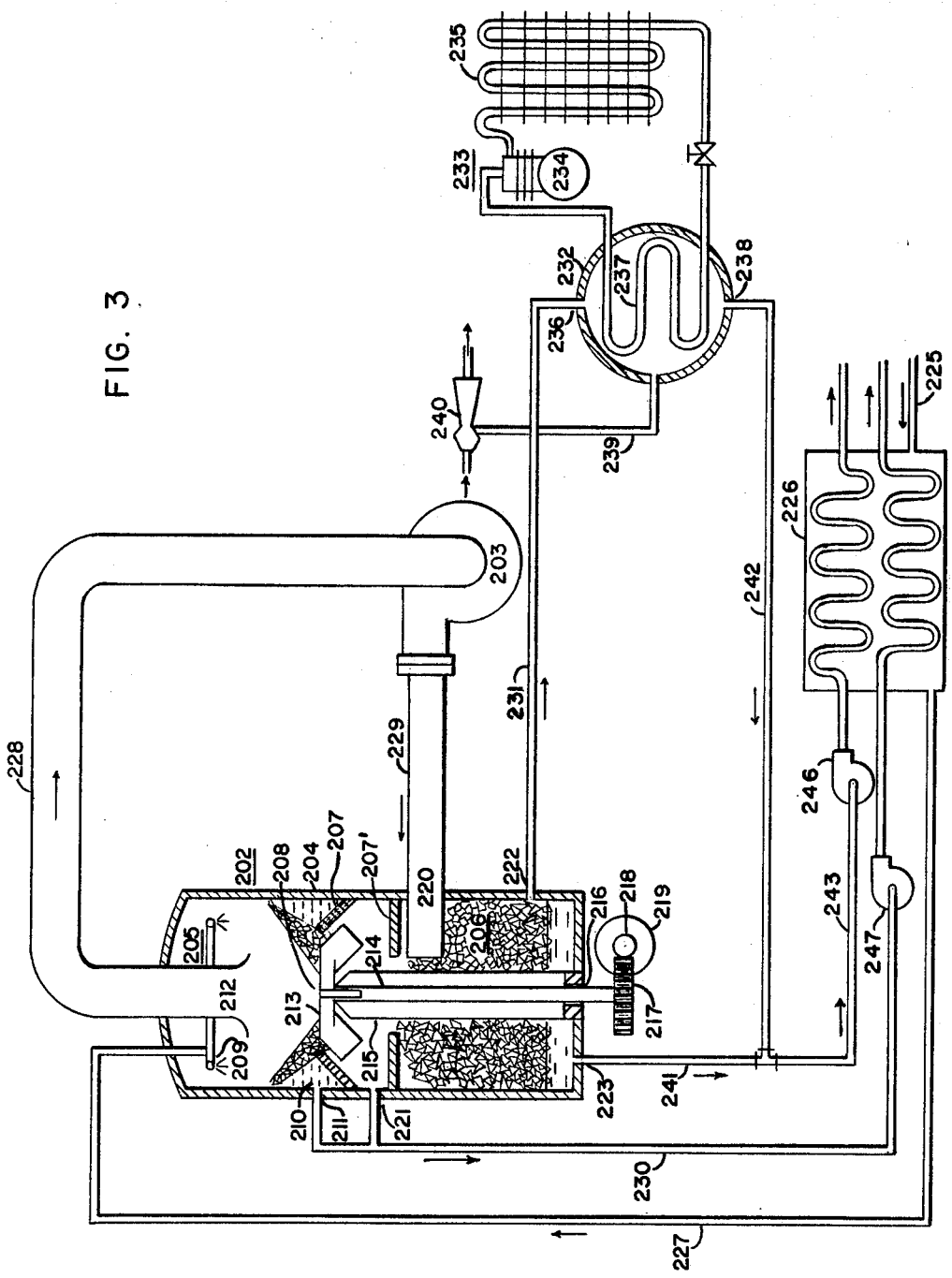
FIGURE 3 is a diagrammatic view of a further embodiment of the invention utilizing a compressor for primary freezing and a centrifugal type separator.

Referring to FIGURE 3, there is shown a modified form of the invention, which includes a unit 202 which carries out the combined operations of freezing, separating and washing sea water after it has been turned into a mixture of ice and brine solution. Operatively associated with this unit is a compressor 203 which creates the freezing effect in the unit.

Unit 202 includes a vertical cylindrical shell 204 which is divided into a freezing section 205 and a separator section 206. A partition in the shape of a truncated conical surface 207 separates the sections 205, 206, an opening 208 being provided in the surface to connect the sections.

Freezing section 205 comprises the upper portion of the shell. Located inside the upper closed end of the shell are the nozzles 209 which are oriented in a circular pattern with the nozzles pointed at skew angles to impart a whirling effect to the sea water as it is introduced into the freezing section. The upper surface of the partition 207 provides a circular trough as shown at 210 in the freezing section. Located in this trough and communicating with the exterior is a brine solution discharge outlet 211. A vapor outlet 212 is placed in the upper portion of the freezing section. In operation, sea water is introduced through the nozzle 209 into the freezing section 205 maintained under vacuum as in the flash evaporators previously described. Sea water discharged in freezing section 205 is flash cooled, forming a mixture of ice and brine solution. The mixture, because of the orientation of the nozzles, has a whirling action imparted thereto as its falls into the trough 210. The brine solution is removed through the discharge outlet 211 and the ice formed is discharged through the opening 208. This operation will be more fully explained hereafter.

The lower portion of the shell 204 constitutes a separator section. Directly beneath the opening 208 in the partition 207, there is located an impeller 213 adapted to impart centrifugal forces to the ice and accompanying brine solution coming from the freezing section. This impeller is attached to shaft 214 which extends down through the separator section and is protected by a sheath 215. At the lower portion of the separator section there is a stuffing box 216 through which the shaft extends to the exterior of the shell 204. Drive mechanism for the impeller 213 comprises a worm wheel 217 attached to the shaft 214.

This worm wheel is driven by the worm 218 which in turn is attached to the motor 219.

Located at approximately the same level as the impeller 213 is a vapor inlet 220 which extends well into the separator section so that water vapor introduced will be passed into what is substantially the center portion of the separator section directly below the impeller. Also located approximately at the same level is the brine discharge outlet 221 whose function is similar to the discharge outlet 211. These brine discharge outlets may be of a manifold type construction if desired. As ice and brine solution pass through the opening 208 they are driven outwardly by the impeller 213, the heavier brine being discharged through the discharge outlet 221, the ice falling into the separator section 206. Simultaneous with this centrifugal action, water vapor is introduced through inlet 220 to condense upon the ice as it enters the separator section thereby washing the ice. A partition 207' may be placed beneath the brine discharge and thereby localize the area of washing. Located below the vapor inlet 220 is a vapor discharge outlet 222, through which non-condensed water vapor is withdrawn from the separator section. Located at the bottom of the separator section is the discharge outlet 223 through which potable water, derived from the ice melted in the separator, passes from the shell.

In operation, sea water is introduced through line 225 into heat exchanger 226 where the temperature of the sea water is brought down to a temperature a little above its freezing point. The sea water is then directed to the purifying unit 202 through the line 227. The sea water is introduced into the freezing section of the purifying unit through the nozzles 209 at which point, because of the high vacuum condition inside the shell 204, flash evaporation occurs, water vapor being formed and removed through the vapor outlet 212 through line 228 to the compressor 203. Simultaneously, due to the removal of latent heat from the sea water, freezing occurs so that the mixture of ice and brine solution formed falls to the trough 210. Because of the angular disposition of the nozzles 209, whirling of the liquid in the trough occurs thereby forming a vortex. The surface of this vortex is essentially ice and the liquid in the trough is essentially brine solution. The brine solution is discharged from the trough through the brine outlet 211 and the ice that is formed along the surface of the vortex falls through the opening 208 on to the impeller 213. The ice has now passed into the separator unit. The impeller 213 urges the ice and whatever accompanying the brine solution which falls through the opening 208 outwardly, the heavier brine solution being discharged through outlet 221 and the remaining ice falling downwardly. Simultaneously water vapor withdrawn from the freezing section is forwarded from the compressor 203 through line 229 into the water vapor inlet 220 of the separator unit. The water vapor is discharged approximately at the center of the separator at about the same level as the impeller 213. As the water vapor contacts the ice, the ice condenses part of the water vapor. This condensate washes the brine from the surface and interstices of the ice and then condensate and brine solution joins the main body of brine solution being withdrawn through the outlet 221. The stream of brine solution from the outlets 221 and 211 are brought together in line 230, the brine passing to the heat exchanger 226 where its low temperature is utilized to lower the temperature of the incoming sea water into the system. Pumps 246 and 247 may be utilized in the lines 230 and 243 to assist the liquids through the heat exchanger.

Essentially, the separation process described above is the equivalent of the separation process of the previous two arrangements, except that a centrifugal column of liquid is created in place of the gravity column used for the two previous arrangements.

As the ice leaves the impeller 213, after having been washed by the water vapor, it is sprayed into the main body of the separator 206 in the form of finely divided ice particles. The ice particles serve to condense the water vapor and in turn are melted by the water vapor. The remaining non-condensed water vapor together with any non-condensible gases are passed out of the chamber through outlet 222 to a secondary refrigerating system 223, which is utilized to condense the water vapor.

This secondary refrigeration system in the present embodiment consists of an evaporator 232, a compressor 234 and a condenser 235. The evaporator 232 comprises a horizontal cylindrical shell having a coil 237 therein through which refrigerant is circulated. Water vapor from the separator 206 passes through line 231 into the vapor inlet 236 of the evaporator 232. The water vapor is placed in heat exchange relation with refrigerant coil 237 and is condensed, the condensate being discharged from the shell through outlet 238 and line 242. Non-condensible gases in the evaporator are withdrawn through purge line 239 by any suitable purge 240.

The ice in the separator section 206 melts and forms a pool of potable water which may be withdrawn from the separator through outlet 223. Water from outlet 223 passes through line 241, joining water from evaporator 232 passing through line 242, in line 243 which passes the fresh water to the heat exchanger 226 where the low temperature of the potable water is used to cool incoming sea water. The potable water then passes to a place of use or storage.

The various modifications of the invention described herein include three essential steps, namely, freezing the sea water, separating the ice and the brine solution so formed, and then removing the brine from the surface and interstices of the ice utilizing recirculated potable water in an amount falling between 5% to 15% of the weight of the ice so formed.

The present invention has been described with particular reference to the formation of potable water from sea water. It will be understood the structure and method of the invention may be applied to the concentration of fruit juices, purification of water, etc., with only slight adaptations in the present equipment and described methods.

While I have described preferred embodiments of the invention, it will be understood the invention is not limited thereto since it may be otherwise embodied within the scope of the following claims.

I claim:

1. In a system for rendering a saline solution potable, the combination of means providing a low pressure region; means for supplying brine solution in said region; brine solution discharged in said region vaporizing to form ice in said solution; a separator for separating ice from said solution, said separator including a vertically extending vessel having an open end, means substantially surrounding the open end of the vessel for receiving separated ice, an outlet for brine solution in said vessel spaced from the open end thereof; an inlet in said vessel for a mixture of ice and brine solution, said inlet being placed between the open end of the vessel and the outlet of the vessel, ice in said vessel separating from remaining brine solution in said vessel by forces of gravity, means for supplying the mixture of ice and brine solution from the low pressure region to the separator inlet, means for discharging a potable medium directly on the separated ice in said vessel to wash brine from the surfaces and interstices of the ice, said medium providing a continuous washing operation as it moves downward in a counter-flow relation to the ice in the vessel thereby increasing in brine concentration, means placed adjacent the open end of the vessel for transferring the washed ice to the receiving means, means for removing the solution of brine from the vessel and means for melting ice to form potable water.

2. A system for rendering the saline solution potable according to claim 1 in which the receiving means comprises a trough adjacent the open end of the separator vessel and the melting means place condensed vapor in heat exchange realtion with the ice in the trough.

3. A system for rendering a saline solution potable according to claim 2 in which means are provided for compressing vapor from the low pressure region, and a heat exchanger is provided for placing the compressed vapor in heat exchange relation with a cooling medium to form the potable medium empolyed for washing the ice in the vessel and for melting the ice in the trough.

References Cited

UNITED STATES PATENTS

| 2,324,869 | 7/1943  | Oman    | 62—58   |
|-----------|---------|---------|---------|
| 2,617,274 | 11/1952 | Schmidt | 62—58   |
| 1,865,614 | 5/1932  | Caldwell| 62—58   |
| 2,009,283 | 7/1935  | Warner  | 62—58   |
| 1,931,347 | 10/1933 | Gay.    |         |
| 2,259,841 | 10/1941 | Spiegl  | 65—58 X |
| 2,315,762 | 4/1943  | Ax et al.| 62—58  |
| 2,419,881 | 4/1947  | Borgerd et al. | 62—124 |
| 3,425,235 | 2/1969  | Cox     | 62—58   |

FOREIGN PATENTS

| 70,507  | 6/1946 | Norway. |
| 102,539 | 9/1941 | Sweden. |
| 605,210 | 5/1926 | France. |
| 985,905 | 7/1951 | France. |

OTHER REFERENCES

Pomona Progress Bulletin, Mar. 10, 1955, p. 1, sec. 2. Pomona Man's Plan Converts Sea Water.

NORMAN YUDKOFF, Primary Examiner

U.S. Cl. X.R.

62—58